(12) United States Patent
Wagner et al.

(10) Patent No.: US 8,591,785 B2
(45) Date of Patent: Nov. 26, 2013

(54) DIGITALLY PREPARED STAMP MASTERS AND METHODS OF MAKING THE SAME

(75) Inventors: Christopher A. Wagner, Toronto (CA); Naveen Chopra, Oakville (CA); Barkev Keoshkerian, Thornhill (CA); Michelle Chretien, Mississauga (CA); Jennifer L. Belelie, Oakville (CA); Daryl W. Vanbesien, Burlington (CA)

(73) Assignee: Xerox Corporation, Norwalk, CT (US)

( * ) Notice: Subject to any disclaimer, the term of this patent is extended or adjusted under 35 U.S.C. 154(b) by 384 days.

(21) Appl. No.: 12/987,858

(22) Filed: Jan. 10, 2011

(65) Prior Publication Data

US 2012/0175820 A1    Jul. 12, 2012

(51) Int. Cl.
*B29C 33/38* (2006.01)
*B29C 39/02* (2006.01)
*B29C 39/38* (2006.01)

(52) U.S. Cl.
USPC ............ 264/219; 264/2.5; 264/294; 425/375; 425/385

(58) Field of Classification Search
USPC ............... 264/2.5, 219, 294, 494; 347/88; 425/375, 285
See application file for complete search history.

(56) References Cited

U.S. PATENT DOCUMENTS

| | | | |
|---|---|---|---|
| 5,195,430 A | 3/1993 | Rise | |
| 5,997,795 A * | 12/1999 | Danforth et al. | 264/401 |
| 6,472,523 B1 | 10/2002 | Banning et al. | |
| 6,476,219 B1 | 11/2002 | Duff et al. | |
| 6,576,747 B1 | 6/2003 | Carlini et al. | |
| 6,576,748 B1 | 6/2003 | Carlini et al. | |
| 6,590,082 B1 | 7/2003 | Banning et al. | |
| 6,646,111 B1 | 11/2003 | Carlini et al. | |
| 6,663,703 B1 | 12/2003 | Wu et al. | |
| 6,673,139 B1 | 1/2004 | Wu et al. | |
| 6,696,552 B2 | 2/2004 | Mayo et al. | |
| 6,713,614 B2 | 3/2004 | Carlini et al. | |
| 6,726,755 B2 | 4/2004 | Titterington et al. | |
| 6,755,902 B2 | 6/2004 | Banning et al. | |
| 6,821,327 B2 | 11/2004 | Jaeger et al. | |
| 6,958,406 B2 | 10/2005 | Banning et al. | |
| 7,053,227 B2 | 5/2006 | Jaeger et al. | |
| 7,279,587 B2 | 10/2007 | Odell et al. | |
| 7,279,687 B2 | 10/2007 | Angel et al. | |
| 7,381,831 B1 | 6/2008 | Banning et al. | |
| 7,427,323 B1 | 9/2008 | Birau et al. | |
| 8,394,307 B2 * | 3/2013 | Ikeda et al. | 264/221 |
| 2002/0138049 A1 * | 9/2002 | Allen et al. | 604/272 |
| 2003/0207484 A1 * | 11/2003 | Nishikawa | 438/31 |
| 2005/0151285 A1 * | 7/2005 | Grot | 264/1.36 |
| 2007/0120910 A1 | 5/2007 | Odell et al. | |
| 2008/0016686 A1 * | 1/2008 | Lee et al. | 29/846 |
| 2008/0218540 A1 | 9/2008 | Iftime et al. | |
| 2009/0004320 A1 * | 1/2009 | Ohashi et al. | 425/385 |
| 2010/0092684 A1 * | 4/2010 | Kataho et al. | 427/424 |

\* cited by examiner

*Primary Examiner* — Seyed Masoud Malekzadeh
*Assistant Examiner* — Nahida Sultana
(74) *Attorney, Agent, or Firm* — Pillsbury Winthrop Shaw Pittman LLP

(57) ABSTRACT

Positive and negative stamp masters derived from UV curable ink molds comprising ultraviolet (UV) curable inks and methods for digitally preparing those stamp masters. In particular, the digitally prepared molds provide a method of printing micropatterns of fine variable features or images in a more efficient manner than the methods currently available.

18 Claims, 3 Drawing Sheets

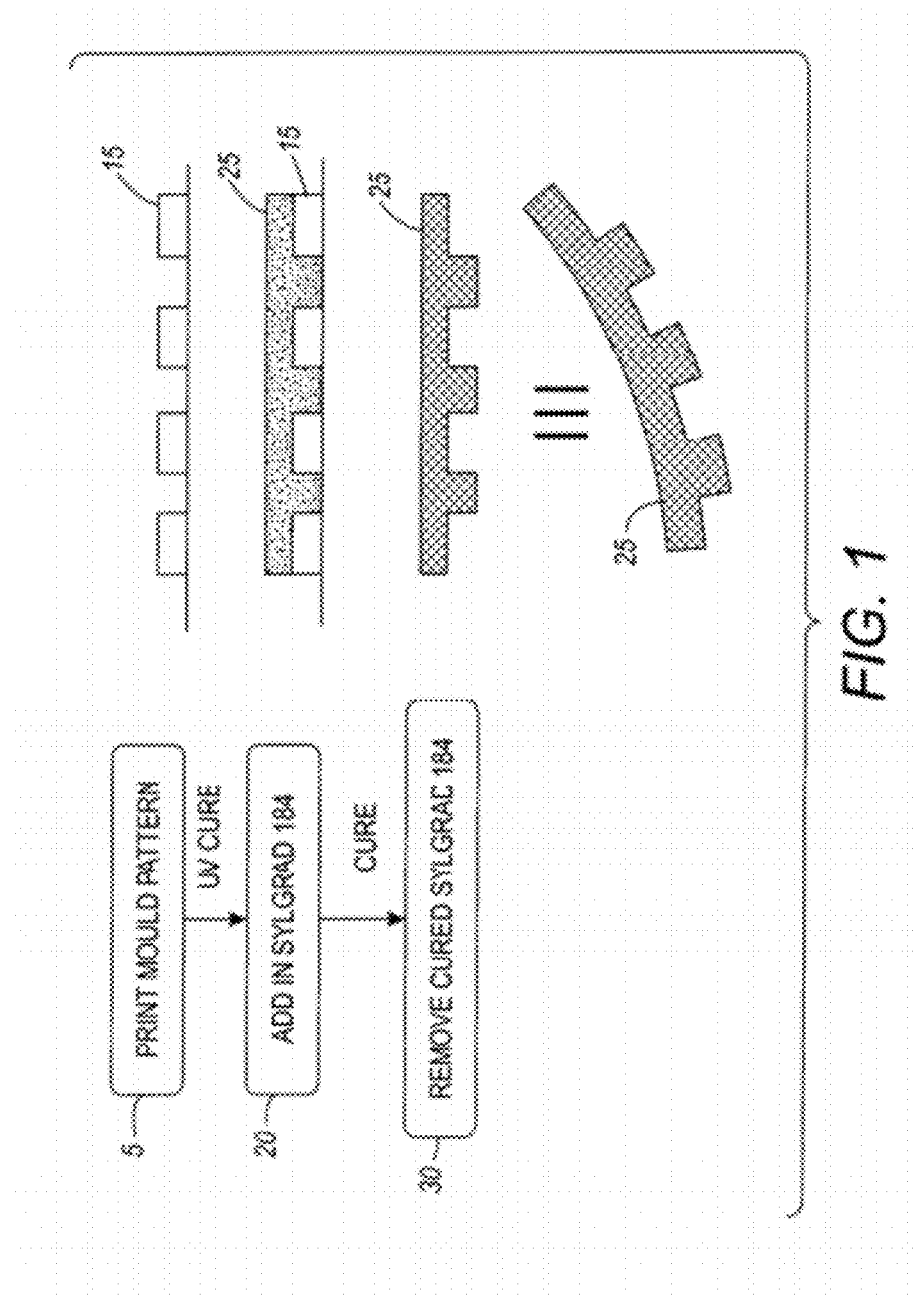

DIGITALLY PREPARED STAMP MASTERS AND METHODS OF MAKING THE SAME

CROSS REFERENCE TO RELATED APPLICATIONS

Reference is made to commonly owned and co-pending, U.S. patent application to Wagner et al., filed the same day as the present application, entitled, "Digitally Prepared Stamp Masters and Methods of Making the Same", the entire disclosure of

BACKGROUND

The present embodiments are directed to digitally prepared printing stamps or molds and methods of making the same which employ ultraviolet (UV) curable solid or phase change ink compositions. The solid ink compositions disclosed herein are characterized by being solid at room temperature and molten at an elevated temperature at which the molten ink is applied to a substrate. These solid ink compositions can be used for direct-to-paper (DTP) and/or ink jet printing.

Solid ink compositions used for ink jet printing typically contain both a colorant and vehicle or carrier, where the vehicle or carrier is a material that dissolves or suspends the colorant. For example, a simple solid ink composition is composed of wax as the carrier and a pigment or dye as the colorant. Many solid ink compositions may contain functionalized wax components, which allow rapid phase transitions from the molten liquid state to the solid states. Solid ink compositions also generally include resins in relatively large quantities. Resins allow the ink to be sufficiently tough after cooling so that the ink is more resistant to mechanical loads on the printed substrate, such as gumming, scratching and folding. The present embodiments employ these solid ink compositions in a novel method for printing fine images on a large scale.

Preparation of micron- and millimeter-sized raised features usually requires a "master" or "stamp" to imprint the features onto the object of interest. These stamps are typically prepared using two methods 1) photolithography involving film casting, irradiation through masks, and solvent-based etching methods and 2) mechanical machining involving a lathe or Computer Numerical Controlled (CNC) machine.

While the above-described methods are satisfactory for their intended purposes, these methods are generally time-consuming and labor intensive. These methods are disadvantageous in that they require a cleanroom, involve wasteful subtractive processes and can be relatively time and energy intensive. There thus exists a need to digitally create stamp masters to facilitate rapid prototyping of fine variable features. As such, there exists a need for a method of preparation of micropattern stamp masters that can be performed more efficiently, especially for printing of fine variable features or images. The present embodiments thus provide a novel digital method of creating stamp masters to facilitate rapid prototyping of fine features or images, including fine variable features or images.

As used herein, the terms "solid ink compositions" and "radiation curable phase change ink compositions" are interchangeable.

SUMMARY

According to embodiments illustrated herein, there is provided novel methods for producing micropatterned arrays on a large scale. In particular, the present embodiments are directed to digitally prepared printing stamps and methods of making the same which employ ultraviolet (UV) curable solid or phase change ink compositions.

In particular, the present embodiments provide a method for digitally forming a mold for embossing or printing micropatterns comprising: inkjetting an ultraviolet curable solid ink onto a first substrate to form a positive mold; and radiation curing of the positive mold. The present embodiments also provide a method that further comprises: adding an elastomeric composition in a layer over the cured positive mold; curing the elastomeric layer over the cured positive mold to form a negative mold; and removing the cured negative mold from the cured positive mold.

In further embodiments, there is provided a method for digitally forming a mold for embossing or printing micropatterns comprising: inkjetting a first ultraviolet curable solid ink onto a first substrate to form a positive mold; radiation curing of the positive mold; casting, a film of or inkjetting an elastomeric composition in a layer over the cured positive mold; curing the elastomeric composition over the cured positive mold to form a negative mold; and removing the cured negative mold from the cured positive mold.

In other embodiments, there is provided a method for embossing or printing micropatterns comprising: inkjetting an ultraviolet curable solid ink onto a first substrate to form a positive mold; radiation curing of the positive mold; casting a film of or inkjetting an elastomeric composition in a layer over the cured positive mold; curing the elastomeric composition over the cured positive mold to form a negative mold; removing the cured negative mold from the cured positive mold; and applying the positive mold or negative mold to a second substrate to form an embossing or micropattern.

BRIEF DESCRIPTION OF THE DRAWINGS

For a better understanding of the present embodiments, reference may be had to the accompanying figures.

FIG. 1 is a flow chart and corresponding schematics to illustrate a method of digitally creating patterning molds according to the present embodiments;

DETAILED DESCRIPTION

Figure 1A:
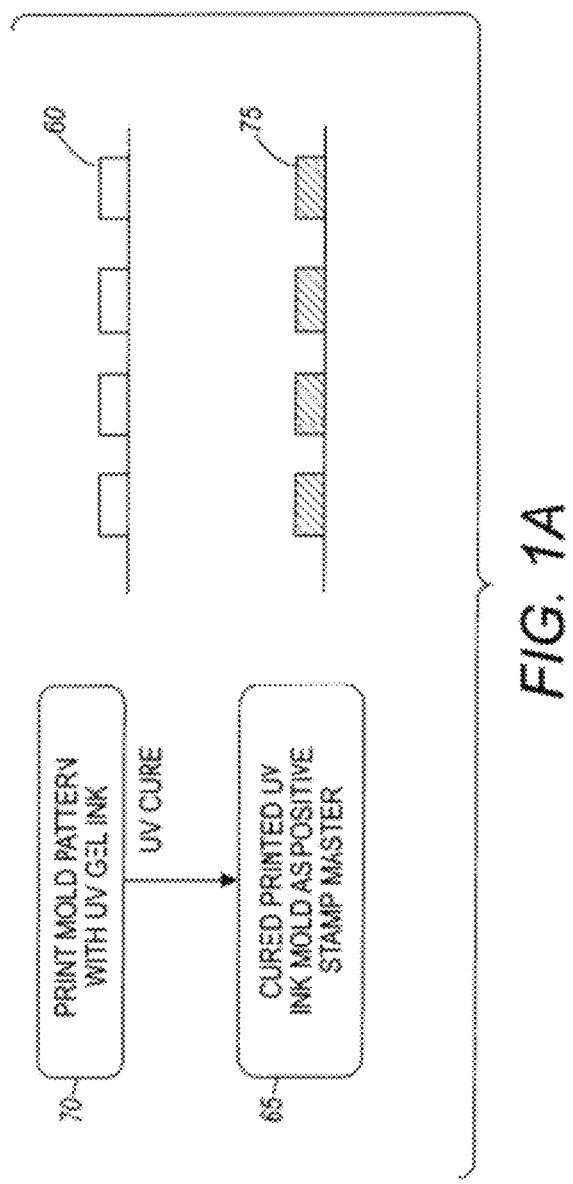
FIG. 1A is a flow chart and corresponding schematics to illustrate an alternative method of digitally creating patterning molds according to the present embodiments.

In the following description, it is understood that other embodiments may be utilized and structural and operational changes may be made without departure from the scope of the present embodiments disclosed herein.

Solid ink technology broadens printing capability and customer base across many markets, and the diversity of printing applications will be facilitated by effective integration of printhead technology, print process and ink materials. The solid ink compositions are characterized by being solid at room temperature and molten at an elevated temperature at which the molten ink is applied to a substrate. The present embodiments employ these solid ink compositions in a novel method for printing fine images on a large scale. More specifically, these embodiments provide for digitally prepared printing stamps and methods of making the same which employ the solid ink compositions.

In the present embodiments, UV curable solid ink compositions are used to prepare positive and negative mold masters for use in making micropattern stamps. Positive molds are the original molds that are initially formed by a printing process and negative molds are those that are subsequently formed by using the positive molds. Thus, the negative molds are essentially the inverted shape of the positive molds. The present embodiments can be used to compliment or entirely replace existing photolithography methods and are particularly beneficial for prototyping short run applications or variable feature applications. For example, after the raised features of the molds comprising the UV gel ink are printed and cured, they may be used as stamping or embossing molds for micropatterning other objects, such as for example, drums, soft plastics, wood, and the like.

In the present embodiments, UV curable solid inks are used, through inkjet printing, to form three-dimensional features which will be further used to form the digitally created positive and negative molds. In further embodiments, to ensure that the mold is sufficiently robust and compliant, inkjet printing of the UV curable solid inks is used to make the original or positive mold and subsequently a silicone mold is formed of the positive mold to make a micropattern printing surrogate or negative resist.

The mold of the present embodiments comprise an ink vehicle, a gellant, one or more waxes, and a photoinitiator. In embodiments, the mold is formed by printing onto a substrate. In further embodiments, the mold is formed by inkjetting by an inkjet printer onto the substrate. In other embodiments, the second mold may be made comprising an elastomeric composition, for example, a silicone compound and a curing agent. In specific embodiments, the second mold is formed by inkjetting onto the first mold. In such embodiments, the first mold is the positive mold and the second mold is the negative mold. In these embodiments, the negative mold is the "master mold" or "stamp master." However, in other embodiments, the positive mold may be used as the "master mold" or "stamp master." The ink vehicle may be selected from the group consisting of UV curable monomers and oligomers, and mixtures thereof and is present in an amount of from about 5 to about 85 percent by weight of the total weight of the mold. The gellant may be an amide gellant or the like, and is present in an amount of from about 2 to about 25 percent by weight of the total weight of the mold. The one or more waxes is selected from the group consisting of Unilin 350 acrylate, behenyl acrylate, octadecyl acrylate, acrylated $C_{12}$ linear alcohols, and the like, and mixtures thereof and may be present in an amount of from about 1 to about 25 percent by weight of the total weight of the mold. The photoinitiator may be selected from the group consisting of alpha-hydroxy ketones, mono-acyl phosphine oxides, bis-acyl phosphine oxides, and the like, and mixtures thereof and is present in an amount of from about 1 to about 15 percent by weight of the total weight of the mold.

In embodiments, the compounds disclosed herein are curable. "Curable" as used herein means polymerizable or chain extendable, that is, a material that can be cured via polymerization, including, but not limited to, free radical polymerization or chain extension, cationic polymerization or chain extension, and/or in which polymerization is photoinitiated through use of a radiation sensitive photoinitiator. Radiation curable as used herein is intended to cover all forms of curing upon exposure to a radiation source, including, but not limited to, light and heat sources and including in the presence or absence of initiators. Examples of radiation curing include, but are not limited to, ultraviolet (UV) light, for example having a wavelength of from about 200 to about 400 nanometers, visible light, or the like, optionally in the presence of photoinitiators and/or sensitizers, electron-beam radiation, optionally in the presence photoinitiators, thermal curing, optionally in the presence of high temperature thermal initiators (and which are in selected embodiments largely inactive at the jetting temperature when used in phase change inks), and appropriate combinations thereof.

According to the present embodiments, a digitally created printing stamp or mold is made as shown in FIG. 1. A mold pattern is printed onto a substrate 5 using inkjet printing of a UV curable solid ink to form a positive mold 15. The positive mold is then cured. As described above, all forms of curing upon exposure to a radiation source may be used for the curing step. For example, curing can be effected by exposure of the ink image to actinic radiation at any desired or effective wavelength, in embodiments from about 200 nanometers to about 480 nanometers, although the wavelength can be outside of this range. Exposure to actinic radiation can be for any desired or effective period of time, in embodiments for about 0.2 second to about 30 seconds, or from about 1 second to 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

Next, an elastomeric compound such as silicone is added and thermally cured 20 over the positive mold 15 to form a negative mold 25. In this embodiment, the elastomeric compound is cast as a film over the positive mold. In embodiments, the elastomeric composition comprises a silicone resin and a thermal curing agent. In embodiments, the step of curing the elastomeric composition is performed at a temperature of from about 90 to about 120° C. for about 15 to about 120 minutes. The cured negative mold 25 is subsequently removed 30 from the positive mold 15.

In addition to a silicone composition, the negative mold 25 may be also be comprised of a UV curable ink, and can be the same or different composition as the ink material 40 to be inked. However, the negative mold must have sufficient compliance or flexibility as well as non-adhesive properties (similar to that of a silicon rubber) that will allow for the proper release of the cured component from out of the positive mold 15. The flexibility also needs to be similar to that of a silicone rubber for stamping functionality. In this embodiment, where the negative mold comprises a UV curable ink, the UV curable ink may either be jetted onto the cured positive mold or also cast as a film (as described for the elastomeric compound). It is generally understood that the cast material will flow into the defined features created by the original cured mold and take on a well-defined shape.

The molds 15, 25 of the present embodiments may be used to create embossed variable features in a soft wax, wood, or plastic film, or the like, by digitally creating the molds 15, 25 with cured inkjet ink and subsequently pressing those molds into the soft wax or wood or plastic to create the desired embossed features.

In the embodiment described above, the master mold 25 is composed of a compliant composition. As such, this embodiment is suitable for micropatterning that needs a flexible stamp, for example in the micropatterning of curved objects like drums and rolls. In such an embodiment, the master mold 25 can be used to create a micropattern in a very soft material, for example, another rubber prepolymer surface, or on a curved surface.

In FIG. 1A, an alternative method of digitally creating printing molds is illustrated. In FIG. 1A, the ink mold 60 is printed with a UV curable ink and cured (steps 70 and 65) to achieve a positive mold 75. The resulting positive mold can be used directly as a master mold. In this embodiment, there is no need to create further negative mold, and the positive mold 75 may be used directly for micropatterning of the object of interest. In these embodiments, the master mold 75 can be used for micropatterning materials that do not require the master mold 75 to be flexible or compliant.

The present embodiments provide several advantages, including the ability to digitally print ink masters or ink molds rapidly and with high precision. Moreover, the present embodiments can achieve molds having fine feature sizes on the sub-millimeter scale. Such feature sizes, can be readily achieved with inkjet printing. For example, current printheads in XEROX printing machines, such as for example the printhead in the Xerox Phaser Solid Ink line of printers. delivering 20 pL drops can achieve 150 µm line-widths. More advanced printheads delivering 5 pL drops can be used to create sub-100 µm feature sizes. The digitally printed molds of the present embodiments can eliminate the need for time-consuming molding/machining processes. Furthermore, by using an additive process (e.g., process of building up of layers of material) such as printing, fewer materials are required.

In embodiments, the original or positive mold is created by applying multiple sequential layers of ink over a period of time. For example, the mold may be created by applying from about 1 to about 500 layers, or from about 10 to about 100 layers, of ink over a period of from about 30 seconds to about 10 minutes, or from about 1 to about 10 minutes, or from about 2 to about 5 minutes. In embodiments, each printed layer is from about 8 to about 12 µm thick with a total thickness of from about 0.3 mm to about 0.7 mm thick. In a specific embodiment, the printed layer is 10 µm thick with a total thickness of 0.5 mm. The present embodiments allow multiple passes of jetting without having to cure each pass individually, and curing of the final mold is done after all the layers have been deposited.

Any suitable printing device may used herein. In one embodiment, the apparatus is an ink jet printing device as described in commonly assigned, co-pending U.S. Patent Publication No. 2008/0218540, incorporated by reference in its entirety, that includes at least an ink jet print head and a print region surface toward which ink is jetted from the ink jet print head, wherein a height distance between the ink jet print head and the print region surface is adjustable.

The apparatus, as well as the methods herein, may be employed with any desired printing system and marking material suitable for applying a marking material in an imagewise pattern to an intermediate transfer member or directly to an image receiving substrate, such as thermal ink jet printing (both with inks liquid at room temperature and with phase change inks), piezoelectric ink jet printing (both with inks liquid at room temperature and with phase change inks), acoustic ink jet printing (both with inks liquid at room temperature and with phase change inks), thermal transfer printing, gravure printing, electrostatographic printing methods (both those employing dry marking materials and those employing liquid marking materials), and the like. For the purpose of illustration, a piezoelectric phase change ink jet printer for applying marking material in an imagewise pattern to an intermediate transfer member is described.

Radiation curable inks generally comprise at least one curable monomer, a gellant, a colorant, and a radiation activated initiator, specifically a photoinitiator, that initiates polymerization of curable components of the ink, specifically of the curable monomer. U.S. Pat. No. 7,279,587 to Odell et al., the disclosure of which is totally incorporated herein by reference, discloses photoinitiating compounds useful in curable solid ink compositions. U.S. Patent Publication 2007/0120910 to Odell et al., which is hereby incorporated by reference herein in its entirety, describes, in embodiments, a solid ink comprising a colorant, an initiator, and an ink vehicle.

The ink vehicle may include one or more reactive oligomers, one or more reactive monomers, or a combination of one or more reactive oligomers and one or more reactive monomers. However, in embodiments, the ink vehicle includes at least one reactive (curable) monomer or oligomer, and optionally one or more additional reactive (curable) monomers and/or one or more reactive (curable) oligomers. The curable monomer and/or oligomer of the ink may variously function as a viscosity reducer, as a binder when the composition is cured, as an adhesion promoter, and as a crosslinking agent, for example. Suitable monomers and/or oligomers can have a low molecular weight, low viscosity, and low surface tension and comprise functional groups that undergo polymerization upon exposure to radiation such as UV light in the presence of a suitable initiator. The ink vehicle may be the same or different among the inks of the ink set, and thus the curable monomers and/or oligomers may be the same or different among the inks of the ink set.

Suitable radiation, such as UV, curable monomers and oligomers include, for example, acrylated esters, acrylated polyesters, acrylated ethers, acrylated polyethers, acrylated epoxies, urethane acrylates, and pentaerythritol tetraacrylate. Specific examples of suitable acrylated monomers include monoacrylates, diacrylates, and polyfunctional alkoxylated or polyalkoxylated acrylic monomers comprising one or more di- or tri-acrylates. Suitable monoacrylates are, for example, cyclohexyl acrylate, 2-ethoxy ethyl acrylate, 2-methoxy ethyl acrylate, 2-(2-ethoxyethoxy)ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, tricyclodecane dimethanol diacrylate, dioxane glycol diacrylate, and the like. Suitable polyfunctional alkoxylated or polyalkoxylated acrylates are, for example, alkoxylated, such as ethoxylated or propoxylated, variants of the following: neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like.

A suitable monomer is a propoxylated neopentyl glycol diacrylate, such as, for example, SR9003 (Sartomer Co., Inc., Exton, Pa.). Other suitable reactive monomers are likewise commercially available from, for example, Sartomer Co., Inc., Henkel Corp., Radcure Specialties, and the like. Specific examples of suitable acrylated oligomers include, for example, acrylated polyester oligomers; such as CN2262 (Sartomer Co), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (UCB Chemicals), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), CN2204 (Sartomer Co.), CN110 (Sartomer Co.), and the like; and pentaerythritol tetraacrylate oligomers, such as SR399LV (Sartomer Co.) and the like.

The at least one radiation curable monomer and/or oligomer can be cationically curable, radically curable, or the like.

The curable monomer and/or oligomer is included in the ink in an amount of, for example, about 20 to about 90% by weight of the ink, such as about 30 to about 80% by weight of the ink, or about 50 to about 70% by weight of the ink.

In specific embodiments, the ink vehicles disclosed herein can comprise any suitable photoinitiator. Examples of specific initiators include, but are not limited to, Irgacure® 127, Irgacure® 379, and Irgacure® 819, all commercially available from BASF Corporation, among others. Further examples of suitable initiators include (but are not limited to) benzophenones, benzophenone derivatives, benzyl ketones, α-alkoxy benzyl ketones, monomeric hydroxyl ketones, polymeric hydroxyl ketones, α-amino ketones, alkoxy ketones, acyl phosphine oxides, metallocenes, benzoin ethers, benzil ketals, α-hydroxyalkylphenones, α-aminoalkylphenones, acylphosphine photoinitiators sold under the trade designations of IRGACURE® and DAROCUR® from BASF, and the like. Specific examples include 1-hydroxy-cyclohexylphenylketone, 2-benzyl-2-(dimethylamino)-1-(4-(4-morpholinyl)phenyl)-1-butanone, 2-methyl-1-(4-methylthio)phenyl-2-(4-morpholinyl)-1-propanone, diphenyl-(2,4,6-trimethylbenzoyl)phosphine oxide, phenyl bis(2,4,6-trimethylbenzoyl)phosphine oxide, benzyl-dimethylketal, isopropylthioxanthone, 2,4,6-trimethylbenzoyldiphenylphosphine oxide (available as BASF LUCIRIN® TPO), 2,4,6-trimethylbenzoylethoxyphenylphosphine oxide (available as BASF LUCIRIN® TPO-L), bis(2,4,6-trimethylbenzoyl)-phenyl-phosphine oxide (available as BASF IRGACURE® 819) and other acyl phosphines, 2-methyl-1-(4-methylthio)phenyl-2-(4-morphorlinyl)-1-propanone (available as BASF IRGACURE® 907) and 1-(4-(2-hydroxyethoxy)phenyl)-2-hydroxy-2-methylpropan-1-one (available as BASF IRGACURE® 2959), 2-benzyl 2-dimethylamino-1-(4-morpholinophenyl)butanone-1 (available as BASF IRGACURE® 369), 2-hydroxy-1-(4-(4-(2-hydroxy-2-methylpropionyl)-benzyl)-phenyl-2-methyl-propan-1-one (available as Ciba IRGACURE® 127), 2-dimethylamino-2-(4-methylbenzyl)-1-(4-morpholin-4-ylphenyl)-butanone (available as BASF IRGACURE® 379), titanocenes, isopropylthioxanthone, 1-hydroxy-cyclohexylphenylketone, 2,4,6-trimethylbenzophenone, 4 methylbenzophenone, 2,4,6-trimethylbenzoylphenylphosphinic acid ethyl ester, oligo(2-hydroxy-2-methyl-1-(4-(1-methylvinyl) phenyl)propanone), 2-hydroxy-2-methyl-1-phenyl-1-propanone, benzyl-dimethylketal, arylsulphonium slats, aryl iodonium salt, and the like, as well as mixtures thereof.

The ink vehicle of one or more inks of the ink set may contain additional optional additives. Optional additives may include surfactants, light stabilizers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, other non-curable waxes, oils, plasticizers, binders, electrical conductive agents, fungicides, bactericides, organic and/or inorganic filler particles, leveling agents, which are agents that create or reduce different gloss levels, opacifiers, antistatic agents, dispersants, and the like. The inks may include, as a stabilizer, a radical scavenger, such as IRGASTAB UV 10 (Ciba Specialty Chemicals, Inc.). The inks may also include an inhibitor, such as a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, for example, from about 4 nanometers to about 560 nanometers, or from about 200 nanometers to about 560 nanometers, or from about 200 nanometers to about 420 nanometers, although the wavelength can be outside of these ranges.

Optionally, the photoinitiator is present in the phase change ink in any desired or effective amount, for example from about 0.5 percent to about 15 percent by weight of the ink composition, or from about 1 percent to about 10 percent by weight of the ink composition, although the amount can be outside of these ranges.

The ink vehicles contain at least one compound that can exhibit gel-like behavior in that they undergo a relatively sharp increase in viscosity over a relatively narrow temperature range when the compound is dissolved in a liquid such as those that behave as curable monomers when exposed to radiation such as ultraviolet light. One example of such a curable liquid monomer is a propoxylated neopentyl glycol diacrylate. In one embodiment, some vehicles as disclosed herein undergo a change in viscosity of at least about $10^3$ centipoise, in another embodiment at least about $10^{4.5}$ centipoise, no more than about $10^9$ centipoise, or no more than about $10^{6.5}$ centipoise over a temperature range of in one embodiment at least about 30° C. in another embodiment at least about 10° C., and in vet another embodiment at least about 5° C., although the viscosity change and temperature range can be outside of these ranges, and vehicles that do not undergo changes within these ranges are also included herein.

Any suitable gellant can be used for the ink vehicles disclosed herein. The gellant can be selected from materials disclosed in U.S. Pat. No. 7,279,687, entitled "Photoinitiator With Phase Change Properties and Gellant Affinity," with the named inventors Peter G. Odell, Eniko Toma, and Jennifer L. Belelie, the disclosure of which is totally incorporated herein by reference, such as a compound of the formula

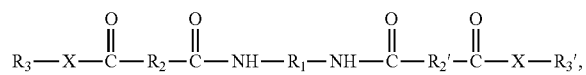

wherein $R_1$ is:

(i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphors, boron, and the like either may or may not be present in the alkylene group), in one embodiment with from about 1 to about 12 carbons, or from about 2 to about 4 carbons, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment from about 5 to about 14 carbons or from about 6 to about 10 carbon atoms, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment from about 6 to about 32 carbons, or from about 7 to about 22 carbon atoms, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with from about 7 to about 32 carbons or from about 7 to about 22 carbon atoms, wherein the substituents on the substituted alkylene, arylene, arylalkylene, and alkylarylene groups can be (but are not limited to) halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ and $R_{2'}$, each, independently of the other, are selected from the group consisting of:

(i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), in one embodiment with from 1 to about 54 carbons or from about 1 to about 34 carbon atom, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), in one embodiment with at least about 5 carbon atoms, and in another embodiment with from about 6 to about 14 carbons or from about 7 to about 10 carbon atoms, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), in one embodiment with from about 6 to about 32 carbons, or from about 7 to about 22 carbon atoms, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), in one embodiment with at least about 6 carbon atoms, and in another embodiment with from about 7 to about 32 carbon atoms or from about 7 to about 22 carbon atoms, wherein the substituents on the substituted alkylene, arylene, arylalkylene, and alkylarylene groups can be (but are not limited to) halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ and $R_{3'}$, each, independently of the other, are either:

(a) photoinitiating groups, such as groups derived from 1-(4-(2-hydroxyethoxy)phenyl)-2-hydroxy-2-methylpropan-1-one, of the formula

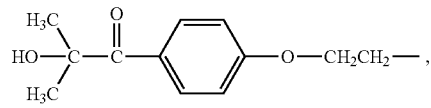

groups derived from 1-hydroxycyclohexylphenylketone, of the formula groups derived from 2-hydroxy-2-methyl-1-phenylpropan-1-one, of the formula

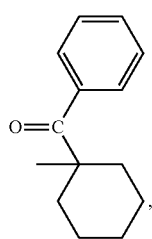

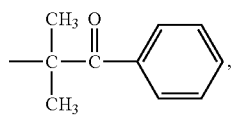

groups derived from N,N-dimethylethanolamine or N,N-dimethylethylenediamine, of the formula

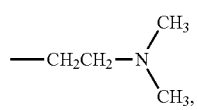

or the like, or:
(b) a group which is:
(i) an alkyl group (including linear and branched, saturated and unsaturated, cyclic and acyclic, and substituted and unsubstituted alkyl groups, and wherein heteroatoms, such as oxygen, nitrogen, sulfur, silicon, phosphorus, boron, and the like either may or may not be present in the alkyl group), in one embodiment from about 2 to about 100 or from about 3 to about 60 or from about 4 to about 30 carbon atoms, although the number of carbon atoms can be outside of these ranges,
(ii) an aryl group (including substituted and unsubstituted aryl groups, and wherein heteroatoms, such as oxygen, nitrogen, sulfur, silicon, phosphorus, boron, and the like either may or may not be present in the aryl group), in one embodiment from about 5 to about 100 or from about 6 to about 60 or from about 6 to about 30 carbon atoms, such as phenyl or the like,
(iii) an arylalkyl group (including substituted and unsubstituted arylalkyl groups, wherein the alkyl portion of the arylalkyl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkyl group), in or embodiment with at least about 6 carbon atoms, and in another embodiment with from about 7 to about 100 or from about 7 to about 60 carbon atoms, although the number of carbon atoms can be outside of these ranges, such as benzyl or the like, or
(iv) an alkylaryl group (including substituted and unsubstituted alkylaryl groups, wherein the alkyl portion of the alkylaryl group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylaryl group), in one embodiment from about 6 to about 100 or from about 7 to about 60 or from about 7 to about 30 carbon atoms, such as tolyl or the like, wherein the substituents on the substituted alkyl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrite groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring: provided that X and X' each, independently of the other, is an oxygen atom or a group of the formula —$NR_4$—, wherein $R_4$ is:

(i) a hydrogen, atom, (ii) an alkyl group, including linear and branched, saturated and unsaturated, cyclic and acyclic, and substituted and unsubstituted alkyl groups, and wherein heteroatoms either may or may not be present in the alkyl group, in one embodiment with from about 1 to about 100 or from about 1 to about 60 or from about 1 to about 30 carbon atoms, (iii) an aryl group, including substituted and unsubstituted aryl groups, and wherein heteroatoms either may or may not be present in the aryl group, in one embodiment with from about 5 to about 100 or from about 6 to about 60 carbon atoms, although the number of carbon atoms can be outside of these ranges, (iv) an arylalkyl group, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, in one embodiment with from about 6 to about 100 or from about 7 to about 60 carbon atoms, although the number of carbon atoms can be outside of these ranges, or (v) an alkylaryl group, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group, in one embodiment with from about 6 to about 100 or from about 7 to about 60 carbon atoms, wherein the substituents on the substituted alkyl, aryl, arylalkyl, and alkylaryl groups can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring. In embodiments, the radiation curable phase change in herein comprises a gellant as described above and optionally a curable wax.

In embodiments, the gelling agent or gellant is a mixture of amide gelling agents of the general structures

13
14
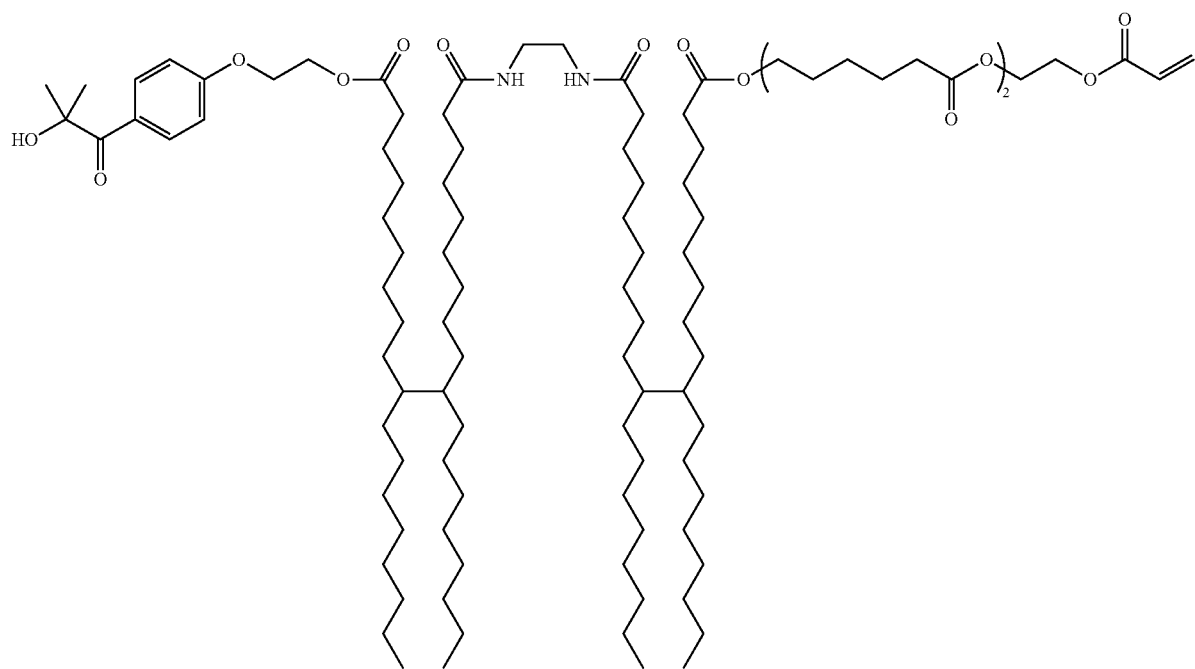
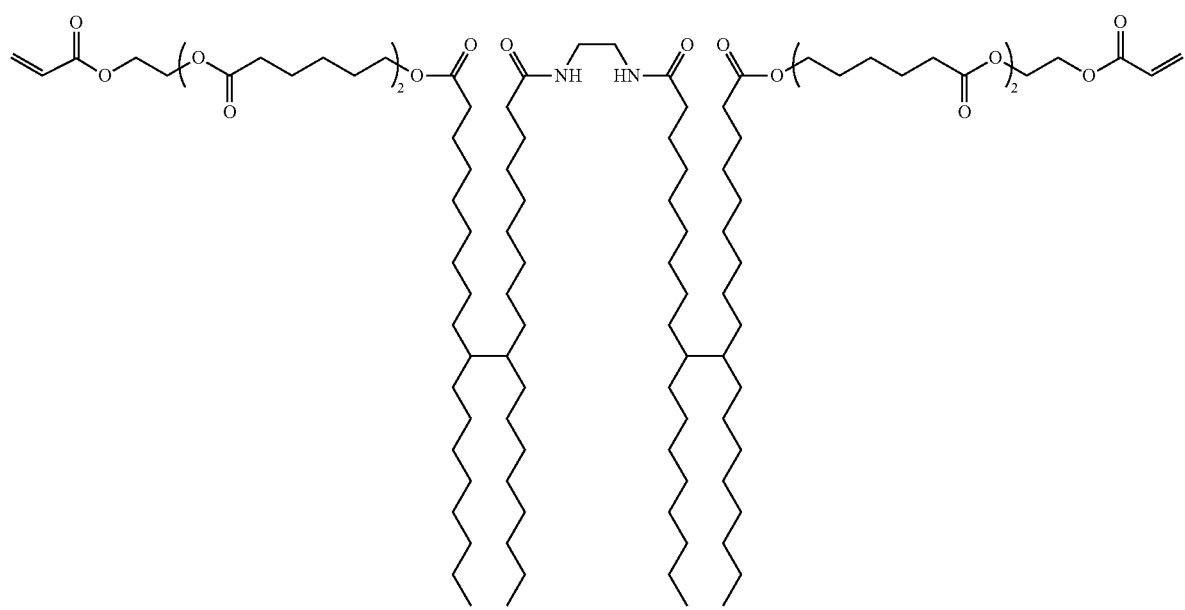

and

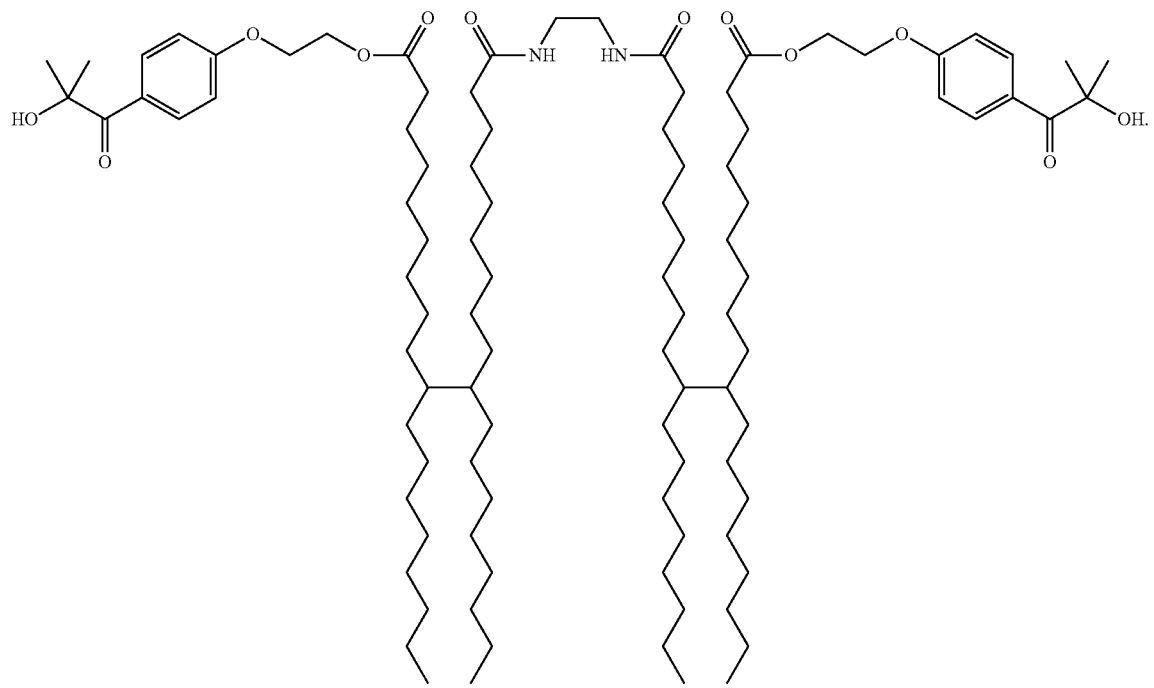

In addition to those gellants disclosed above by U.S. Pat. No. 7,279,687, the gellants of the present embodiments may also be a compound of the formula

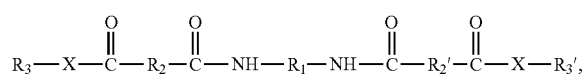

wherein $R_1$ and $R_2$ and $R_2'$ are as described above but wherein at least one of $R_3$ and $R_3'$ is an aromatic group, and provided that neither of $R_3$ and $R_3'$ is a photoinitiator group.

In specific embodiments, the gelling agents of the ink are compounds with the following general structures

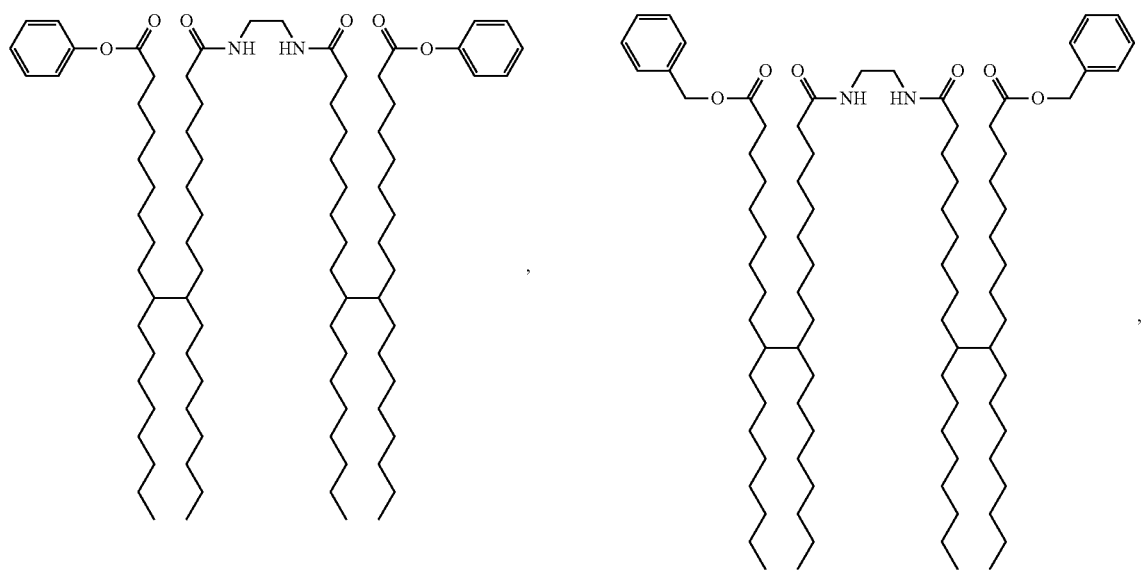

-continued

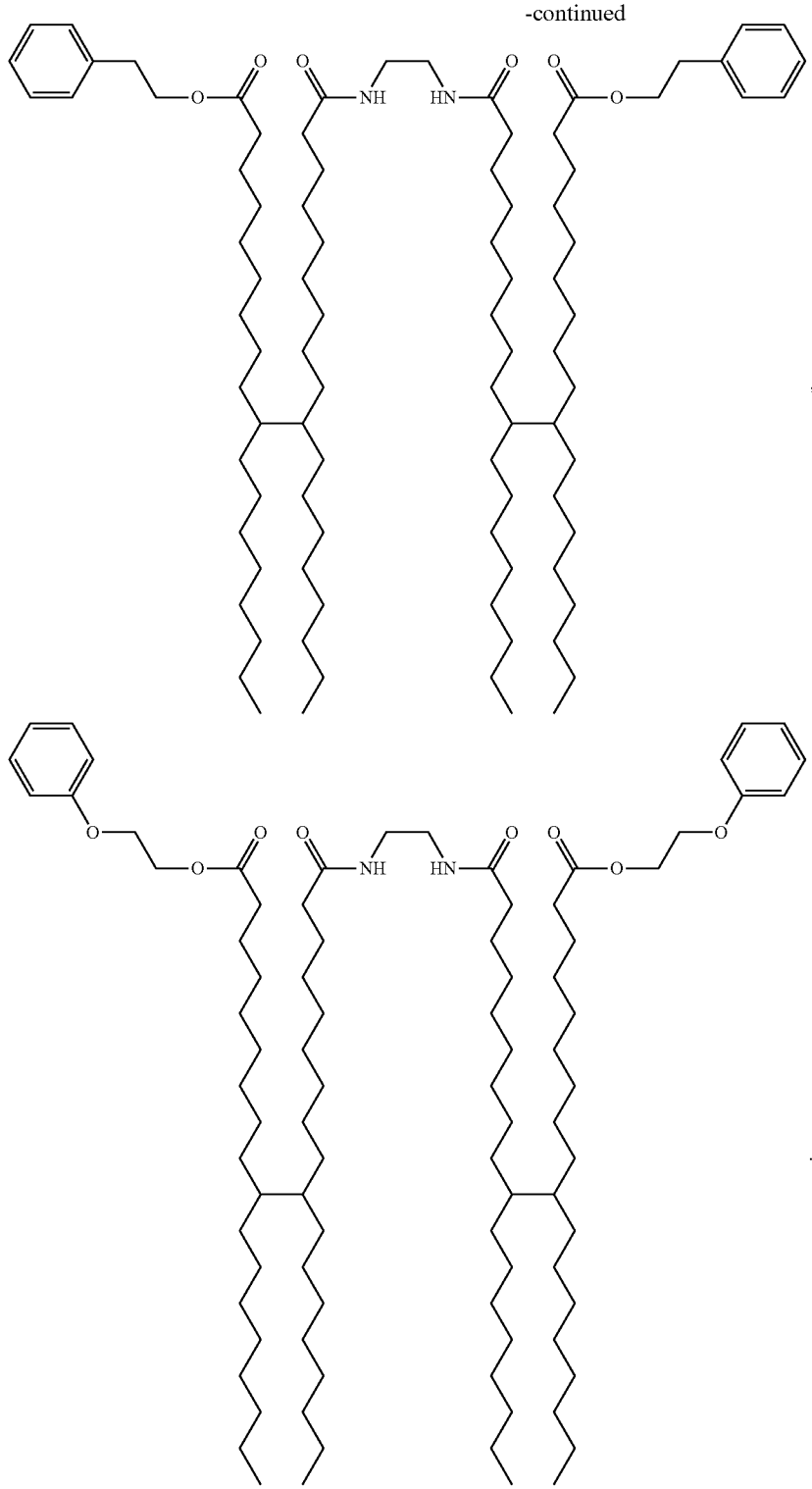

, or

In embodiments, the radiation curable phase change in herein comprises a gellant as described above and optionally a curable wax. The ink compositions can include the gellant in any suitable amount, such as about 1 percent to about 50 percent or from about 2 percent to about 20 percent or from about 5 percent to about 15 percent by weight of the ink.

The curable monomer or prepolymer and curable wax together can form more than about 50 percent, or at least 70 percent, or at least 80 percent by weight of the ink.

In embodiments, the curable phase change ink compositions described herein also may include a pigment as colorant. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASE); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RE (commercially available from Ciba); PALIOGEN Red 3871K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASE); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902$_7$, K6910 (commercially available from BASF); SUNFAST Magenta 122 (commercially available from Sun Chemical); HELIOGEN Blue D6840, D7080 (commercially available from BASF); Sudan Blue OS (commercially available from BASE); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASE); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASE); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASE); Suco-Yellow L1250 (commercially available from BASF); Suco-Yellow D1355 (commercially available from BASF); Suco Fast Yellow D1355, D1351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink 04830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

The pigment may be included in the ink in any suitable amount, such as an amount of from about 0.1 to about 25% by weight of the ink, such as about 0.5 or about 20% to about 1 or about 15% by weight of the ink. The curable phase change inks are solid or solid-like at room temperature. It is desired for the curable phase change inks to have a viscosity of less than about 50 mPas, such as less than about 30 mPas, for example from about 3 to about 30 mPas, from about 5 to about 20 mPas or from about 8 to about 15 mPas, at the temperature of jetting of the ink. Thus, the inks are jetted in a liquid state, which is achieved by applying heat to melt the ink prior to jetting. The inks are desirably jetted at low temperatures, in particular at temperatures below about 120° C., for example from about 50° C. to about 110° C. or from about 60° C. to about 110° C. The inks are thus ideally suited for use in piezoelectric ink jet devices.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLE

The example set forth herein below and is illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Ink Mold Formulation

An ink mold formulation is comprised of the components and amounts of the components according to Table 1.

TABLE 1

| Component | Wt % | m/g |
| --- | --- | --- |
| Amide gellant | 7.5 | 15.00 |
| UNILIN 350-acrylate (wax) | 5.0 | 10.00 |
| SR9003 | 67.8 | 135.60 |
| SR399LV | 5.0 | 10.00 |
| Octadecyl acrylate | 10.0 | 20.00 |
| IRGACURE 819 (photoinitiator) | 1.0 | 2.00 |
| IRGACURE 127 (photoinitiator) | 3.5 | 7.00 |
| IRGASTAB UV10 (radical stabilizer) | 0.2 | 0.40 |

In reference to Table 1, SR9003 is a difunctional monomer vehicle used as the diluent liquid and is a propoxylated neopentyl glycol diacrylate, available from Sartomer Corporation. SR399LV is a multifunctional acrylate monomer used for crosslinking (pentaacryalted dipentaerithritol). Octadecyl acrylate is a hydrophobic wax-like acrylate that is used to modify the ink properties such as viscosity, phase change, and hardness of the final cured ink).

Preparation

A piece of MYLAR was taped to the drum of a commercially available printer, modified for UV ink printing.

The ink layer was built up in 45 sequential revolutions, jetted at 85° C. The thickness of the final ink layer was about 0.475 mm. The ink layer was then cured at 32 fpm using a Fusions UV 600W lamp fitted with a D bulb to form the master mold.

Curing of the ink can be effected by exposure of the ink image to actinic radiation at any desired or effective wavelength, in embodiments from about 200 nanometers to about 480 nanometers, although the wavelength can be outside of this range. Exposure to actinic radiation can be for any desired or effective period of time, in embodiments for about 0.2 second to about 30 seconds, or from about 1 second to 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

Stamp Master Formation

Figure 2:
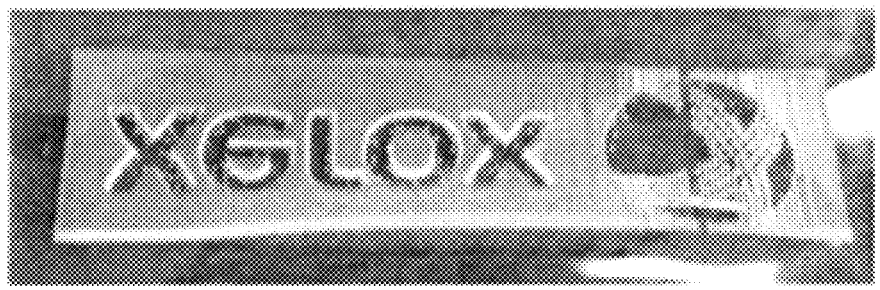
FIG. 2 is a photograph of a cured UV positive mold according to the present embodiments.
Figure 3:
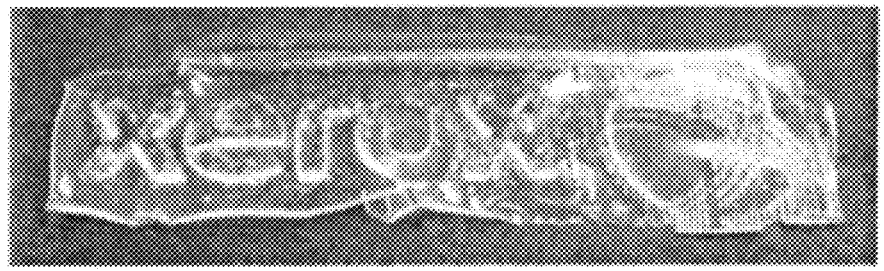
FIG. 3 is a photograph of a negative mold formed from the positive mold of FIG. 2 according to the present embodiments.

The cured UV ink master mold is shown in FIG. 2. Next, a mixture of SYLGARD 184 (a silicone resin comprising 40 to about 70 weight percent dimethyl and methylhydrogen siloxane) and a curing agent was mixed together by hand in a foil pan, de-gassed and spread into the mold, and cured for 1 hour at 90° C. in an oven to form a negative mold. The free standing negative mold was subsequently ready to use as a stamp master in the desired material of interest.

SUMMARY

In summary, there is provided positive and negative ink molds comprising UV curable solid ink compositions and methods for digitally preparing those stamp masters for use in highly efficient printing of micropatterns. The present embodiments provide a rapid additive-approach for making the molds at a micro-scale level on demand. In addition, the resulting molds are thick and sufficiently robust and compliant.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A method for digitally forming a mold for embossing or printing micropatterns comprising: inkjetting a first ultraviolet curable solid ink onto a first substrate to form a positive mold; radiation curing of the positive mold adding an elastomeric composition in a layer over the cured positive mold; inkjetting a second ultraviolet curable ink onto the elastomeric layer; curing the elastomeric layer and the second ultraviolet curable ink over the cured positive mold to form a negative mold; and removing the cured negative mold from the cured positive mold; wherein the ultraviolet curable ink comprises: an ink vehicle; a gellant; one or more waxes; and a photo initiator.

2. The method of claim 1, wherein the positive mold is the master mold.

3. The method of claim 1, wherein the negative mold is the master mold.

4. The method of claim 1, wherein the elastomeric composition comprises an ultraviolet curable solid ink composition or a composition comprising a silicon resin and curing agent.

5. The method of claim 4, wherein the elastomeric composition comprises an ultraviolet curable solid ink composition which is the same as or different from the ultraviolet curable solid ink composition of the positive mold.

6. The method of claim 1, wherein the step of inkjetting the ultraviolet curable solid ink is performed multiple times in sequential order.

7. The method of claim 6, wherein the step of inkjetting the ultraviolet curable solid ink is performed from about 1 to about 500 times in sequential order.

8. The method of claim 1, wherein the positive mold has a thickness of from about 0.3 mm to about 0.7 mm.

9. The method of claim 1, wherein the negative mold has a thickness of from about 0.3 mm to about 0.7 mm.

10. The method of claim 1, wherein the step of inkjetting the ultraviolet curable solid ink is performed over a period of time from about 30 seconds to about 10 minutes.

11. The method of claim of claim 1, wherein the step of curing the positive mold further comprises exposing the positive mold to radiation at a wavelength of from about 200 nanometers to about 480 nanometers.

12. The method of claim 1, wherein the step of curing the positive mold further comprises exposing the positive mold to radiation for from about 0.2 second to about 30 seconds, or from about 1 second to 15 seconds.

13. The method of claim 1, wherein the step of inkjetting the ultraviolet curable solid ink is performed by an inkjet printer.

14. The method of claim 1, wherein the step of curing the elastomeric composition is performed at a temperature of about 20 to about 90° C. for about 15 to about 120 minutes.

15. A method for digitally forming a mold for embossing or printing micropatterns comprising: inkjetting a first ultraviolet curable solid ink onto a first substrate to form a positive mold; radiation curing of the positive mold; casting a film of or inkjetting an elastomeric composition in a layer over the cured positive mold; inkjetting a second ultraviolet curable ink onto the elastomeric layer; curing the elastomeric composition and the second ultraviolet curable ink over the cured positive mold to form a negative mold; and removing the cured negative mold from the cured positive mold; wherein the ultraviolet curable ink comprises: an ink vehicle; a gellant; one or more waxes; and a photoinitiator.

16. A method for embossing or printing micropatterns comprising: inkjetting an ultraviolet curable solid ink onto a first substrate to form a positive mold; radiation curing of the positive mold; casting a film of or inkjetting an elastomeric composition in a layer over the cured positive mold; curing the elastomeric composition over the cured positive mold to form a negative mold; removing the cured negative mold from the cured positive mold; and applying the positive mold or negative mold to a second substrate to form an embossing or micropattern; wherein the ultraviolet curable ink comprises: an ink vehicle; a gellant; one or more waxes; and a photo initiator.

17. The method of claim 16, wherein the first substrate is selected from the group consisting of plain papers, ruled notebook paper, bond paper, silica coated papers, transparency materials, fabrics, textile products, plastics, polymeric films, metals, woods and mixtures thereof.

18. The method of claim 16, wherein the second substrate is selected from the group consisting of plastics, polymeric films, metals, woods and mixtures thereof.

* * * * *